(12) United States Patent
Stager et al.

(10) Patent No.: US 7,315,965 B2
(45) Date of Patent: Jan. 1, 2008

(54) METHOD AND SYSTEM FOR STORING DATA USING A CONTINUOUS DATA PROTECTION SYSTEM

(75) Inventors: Roger Keith Stager, Livermore, CA (US); Donald Alvin Trimmer, Livermore, CA (US); Pawan Saxena, Pleasanton, CA (US); Randall Johnson, Pleasant Grove, UT (US); Craig Anthony Johnston, Livermore, CA (US); Yafen Peggy Chang, Fremont, CA (US); Rico Blaser, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 382 days.

(21) Appl. No.: 10/771,613

(22) Filed: Feb. 4, 2004

(65) Prior Publication Data

US 2005/0193272 A1 Sep. 1, 2005

Related U.S. Application Data

(60) Provisional application No. 60/541,626, filed on Feb. 4, 2004.

(51) Int. Cl.
*G06F 11/00* (2006.01)
(52) U.S. Cl. .......................................... 714/42; 714/13
(58) Field of Classification Search .................. 714/42, 714/5, 2, 13, 52, 15, 11; 707/200, 204, 202
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A * | 9/1997 | Cannon et al. ................ | 714/6 |
| 5,774,292 A | 6/1998 | Georgiou et al. | |
| 5,774,715 A | 6/1998 | Madany et al. | |

(Continued)

FOREIGN PATENT DOCUMENTS

EP 1333379 4/2006

(Continued)

OTHER PUBLICATIONS

Payack, Paul JJ, "Alacritus Software Announces New Customers for Securitus VTLA" Alacritus Software, Jan. 13, 2004.

(Continued)

*Primary Examiner*—Dieu-Minh Le
(74) *Attorney, Agent, or Firm*—Volpe and Koenig, P.C.

(57) ABSTRACT

A method and system wherein data is structured so that writes may be continuously duplicated and a protected volume may be restored to a particular point in time as desired. Writes are continuously duplicated on a secondary volume and organized into delta maps. The delta maps indicate which memory blocks were written to during a particular time frame.

31 Claims, 6 Drawing Sheets

U.S. PATENT DOCUMENTS

| | | | |
|---|---|---|---|
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A * | 10/2000 | West et al. | 711/162 |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 * | 7/2001 | Hsiao et al. | 714/6 |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 * | 2/2004 | Leach et al. | 714/6 |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,973,534 B2 | 12/2005 | Dawson | |
| 6,978,325 B2 | 12/2005 | Gibble | |
| 7,032,126 B2 * | 4/2006 | Zalewski et al. | 714/7 |
| 7,055,009 B2 | 5/2006 | Factor et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,127,388 B2 | 10/2006 | Yates et al. | |
| 7,152,077 B2 * | 12/2006 | Veitch et al. | 707/203 |
| 7,155,586 B1 * | 12/2006 | Wagner et al. | 711/162 |
| 2002/0004835 A1 | 1/2002 | Yarbrough | |
| 2002/0016827 A1 | 2/2002 | Mccabe et al. | |
| 2002/0026595 A1 | 2/2002 | Saitou et al. | |
| 2002/0095557 A1 | 7/2002 | Constable et al. | |
| 2002/0144057 A1 | 10/2002 | Li et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0120676 A1 | 6/2003 | Holavanahalli et al. | |
| 2003/0126388 A1 * | 7/2003 | Yamagami | 711/162 |
| 2003/0135672 A1 | 7/2003 | Yip et al. | |
| 2003/0149700 A1 | 8/2003 | Bolt | |
| 2003/0182350 A1 | 9/2003 | Dewey | |
| 2003/0188208 A1 | 10/2003 | Fung | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 * | 9/2004 | Fujibayashi | 714/6 |
| 2005/0010529 A1 * | 1/2005 | Zalewski et al. | 705/54 |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Passerini | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| EP | 1 671 231 | 6/2006 |
| EP | 1 671231 | 6/2006 |
| WO | WO1999/03098 | 1/1999 |
| WO | WO1999/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacements to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" Internetnews.Com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.

Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Preston, W. Curtis, "Surprise! Cheap Disk Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard-A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWeek, Mar. 24, 2003.

Baltzar, Henry "More Intelligence is on the Way" eWeek, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Intiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SerachStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Announces Disk-Based Successor to Tape" Knapp Comm., Aug. 21, 2002.

* cited by examiner

METHOD AND SYSTEM FOR STORING DATA USING A CONTINUOUS DATA PROTECTION SYSTEM

CROSS REFERENCE TO RELATED APPLICATION(S)

This application claims priority from U.S. Provisional Application No. 60/541,626, entitled "METHOD AND SYSTEM FOR CONTINUOUS DATA PROTECTION," filed on Feb. 4, 2004, which is incorporated by reference as if fully set forth herein.

FIELD OF THE INVENTION

The present invention relates generally to continuous data protection, and more particularly, to storing data using a continuous data protection system.

BACKGROUND

Hardware redundancy schemes have traditionally been used in enterprise environments to protect against component failures. Redundant arrays of independent disks (RAID) have been implemented successfully to assure continued access to data even in the event of one or more media failures (depending on the RAID Level). Unfortunately, hardware redundancy schemes are very ineffective in dealing with logical data loss or corruption. For example, an accidental file deletion or virus infection is automatically replicated to all of the redundant hardware components and can neither be prevented nor recovered from by such technologies. To overcome this problem, backup technologies have traditionally been deployed to retain multiple versions of a production system over time. This allowed administrators to restore previous versions of data and to recover from data corruption.

Backup copies are generally policy-based, are tied to a periodic schedule, and reflect the state of a primary volume (i.e. a protected volume) at the particular point in time that is captured. Because backups are not made on a continuous basis, there will be some data loss during the restoration, resulting from a gap between the time when the backup was performed and the restore point that is required. This gap can be significant in typical environments where backups are only performed once per day. In a mission-critical setting, such a data loss can be catastrophic. Beyond the potential data loss, restoring a primary volume from a backup system, can be very complicated and often takes many hours to complete. This additional downtime further exacerbates the problems associated with a logical data loss.

The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day. These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups over time. It is noted that the daily backups would typically not all get discarded on the same day. Instead, the Monday backup set is overwritten on Monday, the Tuesday set is overwritten on Tuesday, etc. This ensures that a backup set is available that is within 8 business hours of any corruption that may have occurred in the past week.

Despite frequent hardware failures and the necessity of ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long. Once the backup tapes are located, they must be restored to the primary volume. Even under the best of circumstances, this type of backup and restore process cannot guarantee high availability of data.

Another type of data protection involves creating point in time (PIT) copies of data. A first type of PIT copy is a hardware-based PIT copy, which is a mirror of the primary volume onto a secondary volume. The main drawbacks to a hardware-based PIT copy are that the data ages quickly and that each copy takes up as much disk space as the primary volume. A software-based PIT, typically called a "snapshot," is a "picture" of a volume at the block level or a file system at the operating system level. Various types of software-based PITs exist, and most are tied to a particular platform, operating system, or file system. These snapshots also have drawbacks, including occupying additional space on the primary volume, rapid aging, and possible dependencies on data stored on the primary volume wherein data corruption on the primary volume leads to corruption of the snapshot. In addition, snapshot systems generally do not offer the flexibility in scheduling and expiring snapshots that backup software provides.

While both hardware-based and software-based PIT techniques reduce the dependency on the backup window, they still require the traditional tape-based backup and restore process to move data from disk to tape media and to manage the different versions of data. This dependency on legacy backup applications and processes is a significant drawback of these technologies. Furthermore, like traditional tape-based backup and restore processes, PIT copies are made at discrete moments in time, thereby limiting any restores that are performed to the points in time at which PIT copies have been made.

A need therefore exists for a system that combines the advantages of tape-based systems with the advantages of snapshot systems and eliminates the limitations described above.

SUMMARY

The present invention is a method and system where data is structured so that writes may be continuously duplicated and a protected volume may be restored to any particular point in time, as desired. Writes are continuously logged to a secondary volume in a sequential fashion and meta-data regarding the secondary volume is organized in the form of delta maps. The delta maps indicate which volume blocks were written to during a particular time frame and point to the location of the actual modified data blocks that were written during this time frame.

BRIEF DESCRIPTION OF THE DRAWING(S)

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENT(S)

In the present invention, data is backed up continuously, allowing system administrators to pause, rewind, and replay live enterprise data streams. This moves the traditional backup methodologies into a continuous background process in which policies automatically manage the lifecycle of many generations of restore images.

Figure 1A:
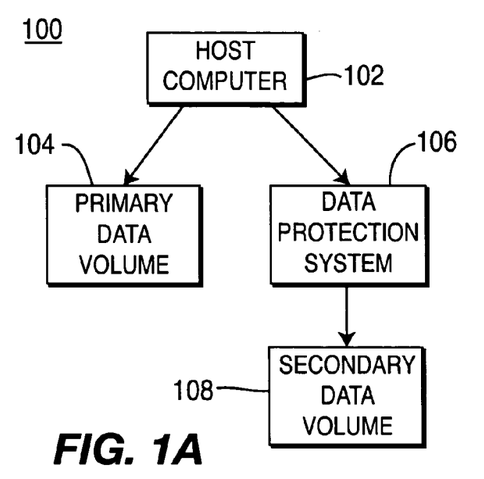
FIGS. 1A-1C are block diagrams showing a continuous data protection environment in accordance with the present invention.

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time by writing directly to the primary data volume 104 and permits the data protection system 106 to focus exclusively on managing the secondary data volume 108. The management of the volumes is preferably performed using a volume manager. The volume manager mirrors writes so that one copy goes to the primary volume 108 and one copy goes to the data protection system 106 which in turn writes sequentially to the secondary volume 108. That is, the data protection pretends to be a regular disk/volume but when writes arrive for a specific address, the system stores them sequentially on the secondary volume 108. A volume manager is software module that runs on a server or intelligent storage switch to manage storage resources. Typical volume managers have the ability to aggregate blocks from multiple different physical disks into one or more virtual volume. Applications are not aware that they are actually writing to segments of many different disks because one large, contiguous volume is presented to them. In addition to block aggregation, volume managers usually also offer software RAID functionality. For example, they are able to split the segments of the different volumes into two groups, where one group is a mirror of the other group. This is, in a preferred embodiment, the feature the present data protection system is taking advantage of when it is implemented as shown in FIG. 1A. In many environments, the volume manager or host-based driver already mirrors the writes to two distinct primary volumes for redundancy in case of a hardware failure. The present invention is configured as a tertiary mirror target in this scenario, such that the volume manager or host-based driver also send copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume is typically an expensive, very fast, highly available storage subsystem, whereas the secondary volume is typically cost-effective, high capacity and comparatively slow (for example, ATA/SATA disks). Normally, the slower secondary volume cannot be used as a synchronous mirror to the high-performance primary volume. This is because the slow response time would have an adverse impact on the overall system performance. The disclosed data protection system, however, is optimized to keep up with high-performance primary volumes. These optimizations are described in more detail below. At a high level, random writes to the primary volume are processed sequentially on the secondary storage. Sequential writes improve both the cache behavior, as well as the actual volume performance of the secondary volume. In addition, it is possible to aggregate multiple sequential writes on the secondary volume, whereas this is not possible with the random writes to the primary volume. Also note that the present invention does not require writes to the data protection system to be synchronous. However, even in the case of an asynchronous mirror, minimizing latencies is important.

Figure 1B:
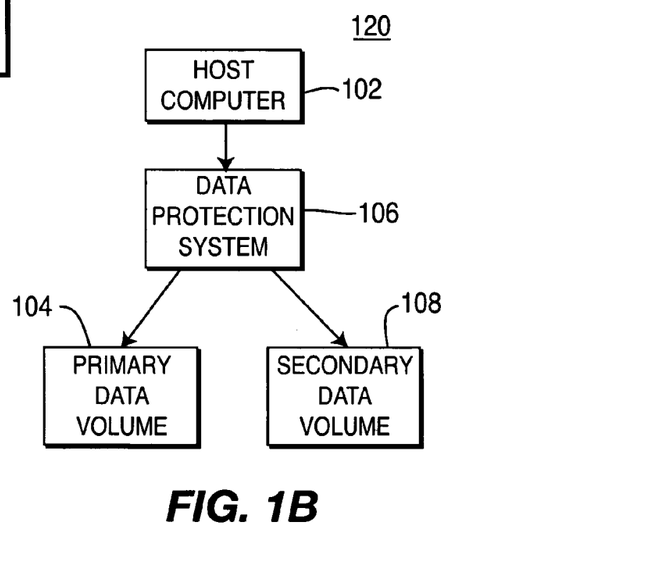

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary volume in the system 120 and lowers the available bandwidth for use. Additionally, the introduction of a new component into the primary data path is undesirable because of reliability concerns. Nonetheless, it is a usable configuration for lower-end deployments.

Figure 1C:
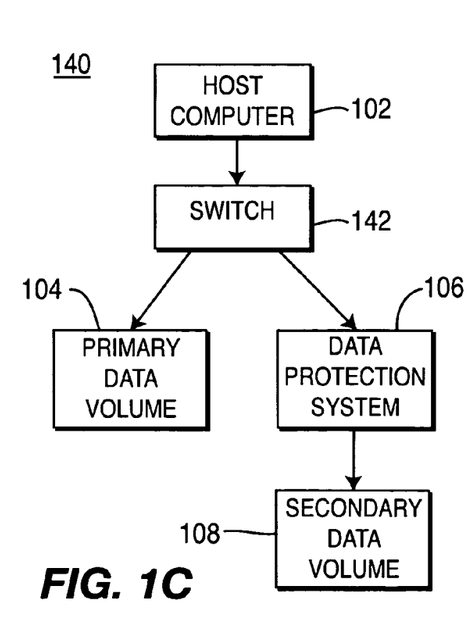

FIG. 1C shows another alternate embodiment of a protected computer system 140 constructed in accordance with the present invention. The host computer 102 is connected to an intelligent switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and to improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

In practice, certain applications require continuous data protection with a block-by-block granularity, for example, to rewind individual transactions. However, the period in which such fine granularity is required is, generally, relatively short (for example two days), which is why the system can be configured to fade out data over time. The present invention discloses data structures and methods to manage this process automatically.

Because data is continuously backed-up in the present invention, reversing each write to get to a particular point in time quickly becomes unfeasible where hundreds, thousands or more writes are logged every second. The amount of data simply becomes too large to scan in a linear fashion. The present invention therefore provides data structures (i.e. delta maps) so that such voluminous amounts of backup data may be efficiently tracked and accessed, as desired.

In typical recovery scenarios, it is necessary to examine how the primary volume looked like at multiple points in time before deciding which point to recover to. For example, consider a system that was infected by a virus. In order to recover from this virus, it is necessary to examine the primary volume as it was at different points in time in order to find the latest recovery point where the system was not yet infected by the virus. In order to efficiently compare multiple potential recovery points, additional data structures are needed. Delta maps provide a mechanism to efficiently recover the primary volume as it was at a particular point in time, without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Figure 2:
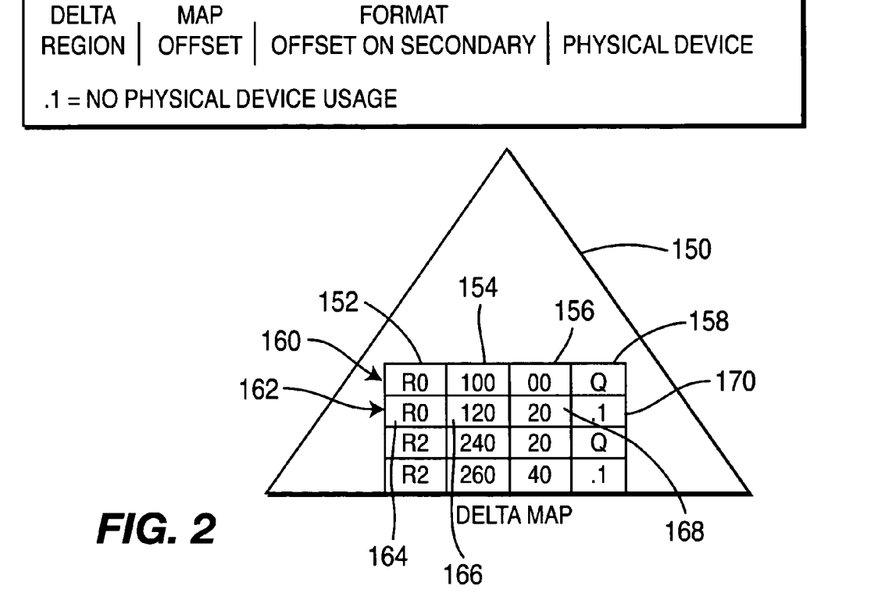
FIG. 2 is a delta map in accordance with the present invention.

Referring now to FIG. 2, there is shown a delta map 150 in accordance with the present invention. While the format shown in FIG. 2 is preferred, any format may of course be used. For each write to a primary volume, a duplicate write is made, in sequential order, to a secondary volume. To create a mapping between the two volumes, it is preferable to have an originating entry and a terminating entry for each write. The originating entry includes information regarding the origination of a write. The terminating entry includes information regarding the termination of a write. For example, as shown in delta map 150, row 160 is an originating entry and row 162 is a terminating entry. Row 160 includes a field 152 for specifying the region of a primary volume wherein the first block was written to; a field 154 for specifying the block offset within that region; a field 156 for specifying where on the secondary volume the duplicate write (i.e. the copy of the primary volume write) begins; and a field 158 for specifying the physical device used to make the write persistent. Row 162 includes a field 164 for specifying the region of the primary volume wherein the last block was written to; a field 166 for specifying the block offset in a region of a primary volume at which the write ends; and a field 168 for specifying where on the secondary volume the duplicate write ends or alternatively, where the next write starts. While field 170 is provided in a terminating entry such as row 162, it is noted that such a field 170 is not necessary since there is no physical device usage associated with termination of a write. Also note that rows 160 and 162 follow the same format in this implementation. In other words, the terminating entry conforms to the same notation as the initiating entry. This is intentional because if a new block were written consecutive to the first block, the initiating entry of the second block would also be the terminating entry for the first block, thus guaranteeing a very compact and space efficient notation.

In a preferred embodiment, as explained above, each delta map contains a list of all blocks that were changed during the particular time period to which the delta map corresponds. That is, each delta map specifies a block region on the primary volume, the offset on the primary volume, and physical device information. This information can then be used to recreate the primary volume as it looked like at a previous point in time. For example, assume that a volume was brand new and that only the two writes in delta map 150 have been committed to it. The map thus contains a list of all modifications since the volume was in its original state. In order to recreate the volume as it was after these two writes (for example, after a failure of the primary volume), the system examines the first two entries in the delta map. These entries are sufficient to determine that a block of data had been written to region R0 on the primary disk at offset 100 and that the length of this write was 20. In addition, fields 156 and 158 can be used to determine where the duplicate copy was written on the secondary volume. This process can then be repeated for each entry and an exact copy of the primary volume at that time can be recreated in this fashion. It is noted that other fields or a completely different mapping format may be used while still achieving the same functionality. For example, instead of dividing the primary volume into block regions, a bitmap could be kept, representing every block on the primary volume.

Figure 3:
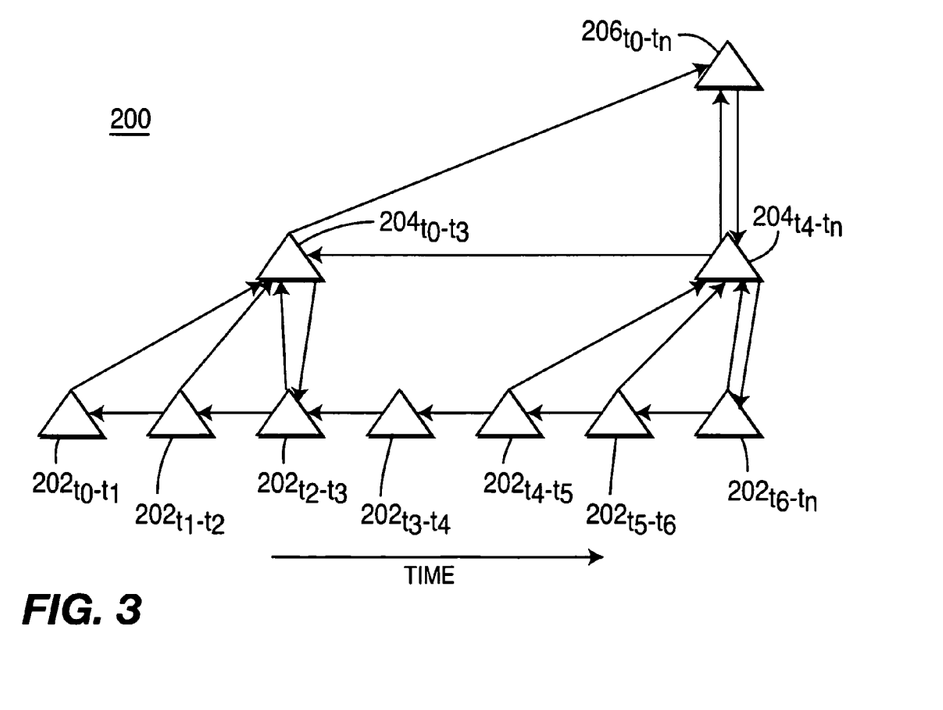
FIG. 3 is a hierarchy of delta maps for storing data in a continuous data protection system.

Referring now to FIG. 3, there is shown a hierarchy 200 of delta maps for storing data in a continuous data protection system. Delta maps 202 are initially created from the write log, using a map engine. This could occur in real-time or after a certain number of writes or according to a time interval, etc. Additional delta maps may also be created as a result of a merge process. Such maps are referred to as merged delta maps 204 and 206 and may be created to optimize the access and restore process. The delta maps 202 are stored on the secondary volume and contain a mapping of the primary address space to the secondary address space. The mapping is kept in sorted order based on the primary address space as illustrated in FIG. 2.

As explained above, each delta map includes information necessary to recreate the changes to the protected volume for a particular time window. For example, delta map $202_{t0-t1}$ corresponds to the change of the protected volume between time zero and time one, delta map $202_{t1-t2}$ corresponds to the change of the protected volume from time one to time two, and so forth. It is noted that these time windows do not necessarily need to be of equal size. If a primary volume is completely destroyed at time n+1, a full restore as of time n may be performed by simply using merged delta map $206_{t0-tn}$. If a loss occurs at time three, and the primary volume needs to be restored, merged delta map $202_{t0-t3}$ may be used. If a loss occurs at time five and the system needs to be restored to time four, merged delta map $204_{t0-t3}$ and delta map $204_{t3-t4}$ may be used.

As shown in FIG. 3, the delta maps are chained together in chronological order. In the preferred embodiment, each delta map points to the previous delta map, a merged delta map if it exists, and, in the case of a pre-merged delta map, to the first child delta map. Other embodiments are possible, for example, where both forward and backward pointers are kept or only forward pointers are kept. The protected volume may therefore be restored using any delta map or pre-merged delta map as desired. In FIG. 3, three levels of pre-merging are implemented. However, it is possible to create a hierarchy of fewer or more levels, as desired.

Figure 4:
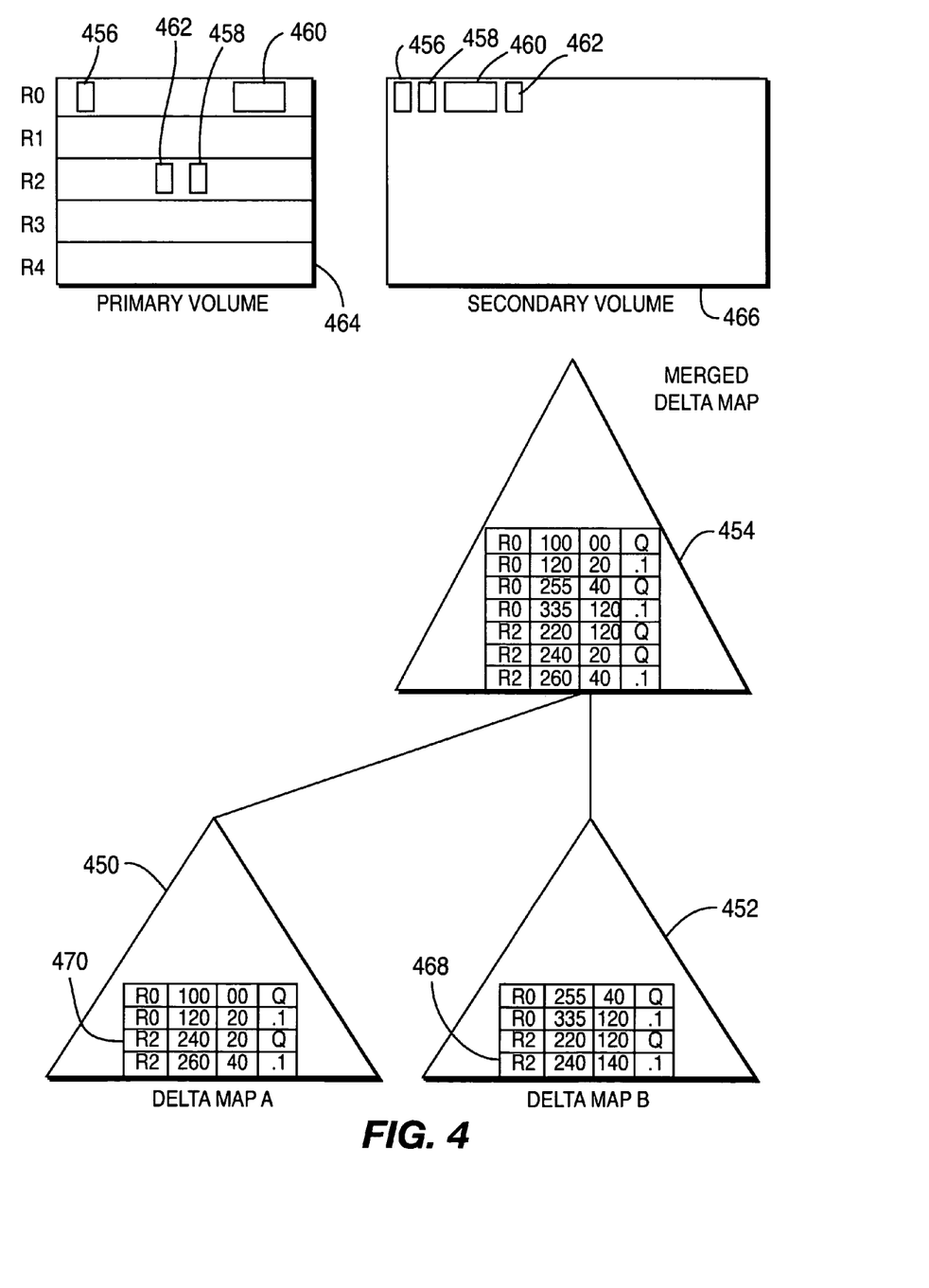
FIG. 4 illustrates how delta maps are merged and how they are used to rewind a system to a previous point in time.

Referring now to FIG. 4, two delta maps 450 and 452 and a merged delta map 454 are shown. In FIG. 4, four writes 456, 458, 460, 462 have been written to a primary volume 464. Increasing reference numerals are used to denote the point in time at which each write occurred. That is, write 456 was before write 458 and so forth. As can be seen from comparing the primary and secondary volumes 464, 466, each write made to the primary volume 464 is duplicated in sequential fashion to the secondary volume 466. Duplicating the writes in sequential fashion allows the order in which writes occurred on the primary volume to be readily apparent from the layout of the secondary volume. Conversely, the original location is not apparent and needs to be stored in the delta maps, as discussed. This example illustrates the difference between block-order and time-order.

Delta map 450 includes the originating and terminating entries for writes 456 and 458 while delta map 452 includes originating and terminating entries for writes 460 and 462. In delta map 450, the two top entries are the originating and terminating entries for write 456 and the two bottom entries are the originating and terminating entries for write 458. Similarly, the two top entries in delta map 452 are the originating and terminating entries for write 460 and the two bottom entries are the originating and terminating entries for write 462. As explained above, the delta maps 450 and 452 include the specifics regarding each write that occurred during the time period covered by the particular delta map.

Delta maps 450 and 452 may be merged into a single merged map 454. One significant benefit of merging delta maps is a reduction in the number of entries that are required. Another, even more significant benefit, is a reduction in the number of blocks that need to be kept on the secondary volume once the lower-level maps are expired. It is noted, however, that this is only the case when a previous block was overwritten by a newer one. For example, in this particular scenario, it is possible to eliminate the terminating entry 468 of write 462 because writes 462 and 458 are adjacent to each other on the primary volume. That is, because there is a terminating entry 468 with the same offset (i.e. 240) as an originating offset 470, the terminating entry 468 may be eliminated in merged delta map 454. By way of further example, if a subsequent write was performed that entirely filled region two (i.e. R2), and the map containing that write was merged with map 454, all of the entries related to R2 would be replaced with the R2 originating and terminating entries for the subsequent write. In this case, it will also be possible to free up the blocks in this region once the delta maps are expired. The delta maps and the structures created by merging maps reduces the amount of overhead in maintaining the mapping between the primary and secondary volumes over time.

Figure 5:
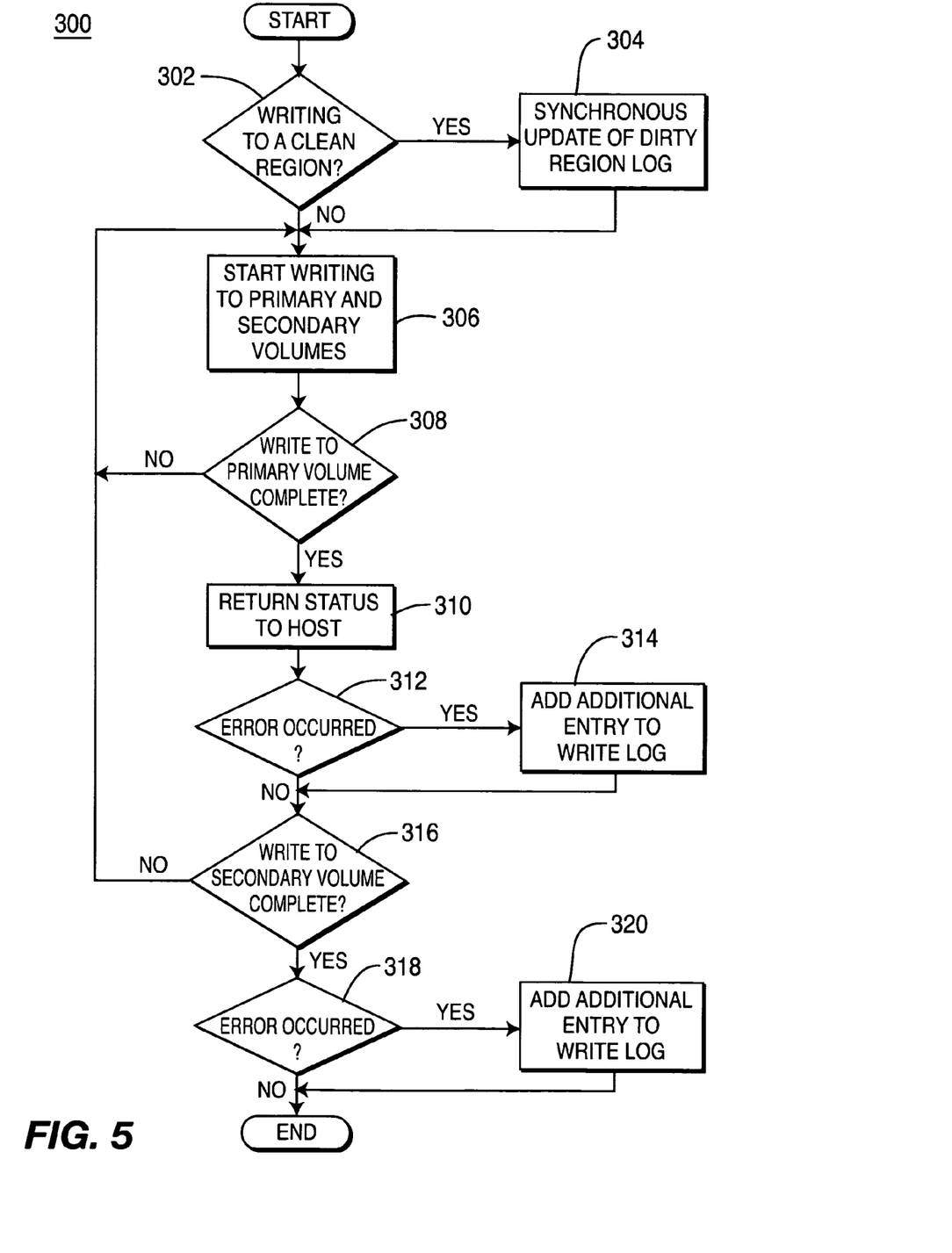
FIG. 5 is a method wherein data is written to a continuous data protection system.

Referring now to FIG. 5, there is shown a method wherein data is written to a continuous data protection system. In this implementation, the primary and secondary storage are managed by the same software, which could either be a host-based driver/software or a switch/appliance. First, it is determined in step 302 whether the system is writing to a clean region. If yes, the dirty region log is updated in step 304 and the system writes to the primary and secondary volumes in step 306. If no, the method 300 proceeds directly from step 302 to step 306.

If writing to the primary volume is complete (step 308), the method proceeds to step 310 wherein the status (i.e., an indication that the primary volume write is complete) is sent to the host. It is important to note that a "good" status can be returned without regard to whether the data made it to the secondary volume in this embodiment. This is advantageous for performance reasons. However, a synchronous embodiment is also possible as described above. The method 300 then proceeds to step 312 to check for errors in the primary volume write. If an error has occurred, an additional entry is added to the write log in step 314 reflecting the fact that an error has occurred and then the method 300 proceeds to step 316. If no error has occurred, the method 300 proceeds directly from step 312 to step 316. In step 316, it is confirmed whether writing to the secondary volume is complete. Once the write is completed, the method 300 proceeds to step 318 to check for errors in the secondary volume write. If an error has occurred, an entry reflecting the fact that an error has occurred is added to the write log (step 320).

Figure 6:
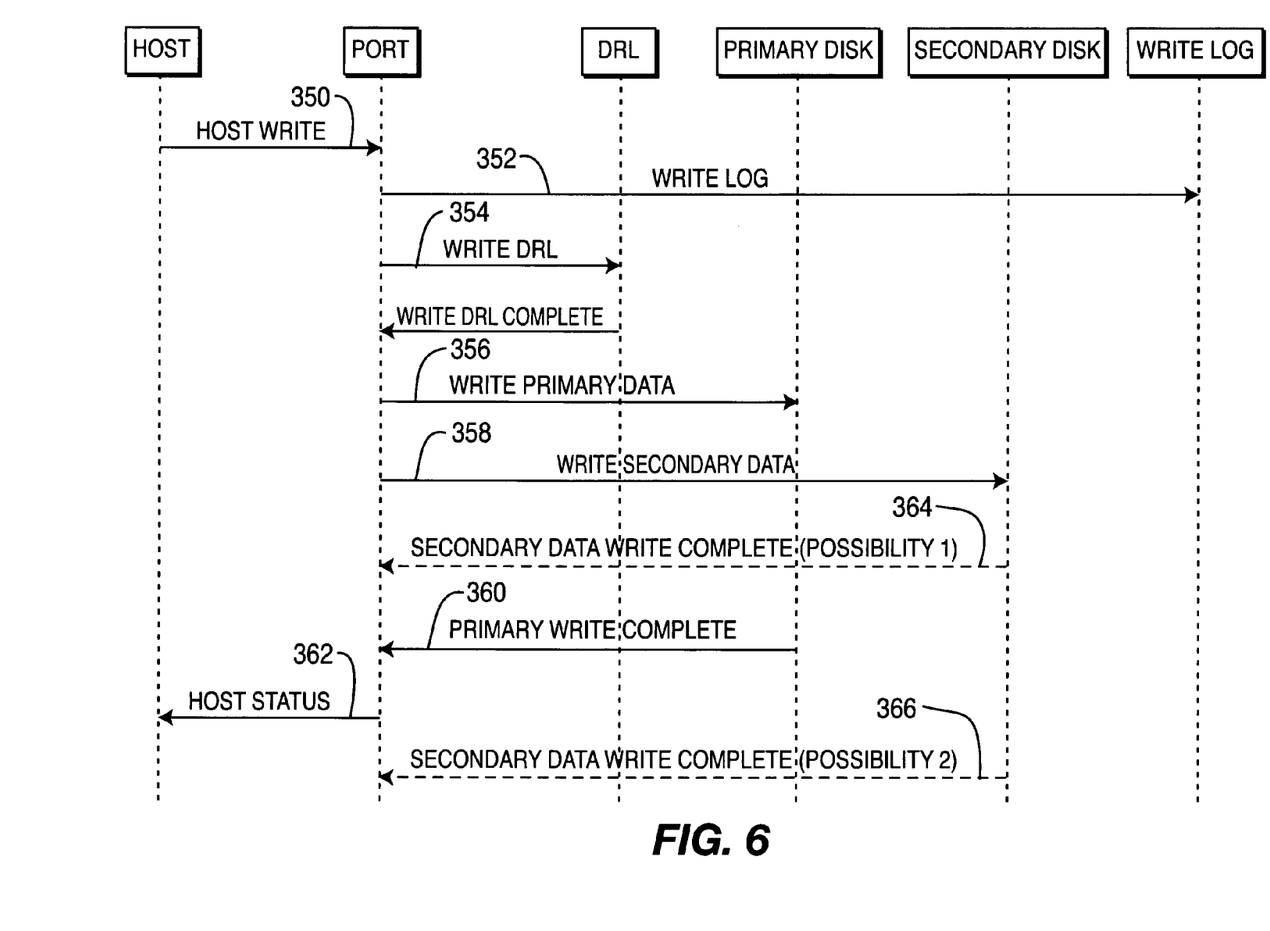
FIG. 6 is a flow diagram illustrating the steps involved when a write is made by a primary volume.

By way of further explanation, the sequence of events performed when a host computer performs a write to a primary volume is shown in FIG. 6. When a host performs a write 350, an entry is added to a write log buffer 352. It is noted that if the write log buffer is full, it is asynchronously flushed. When a write log buffer is flushed, the writes are written out to a secondary volume. That is, duplicated writes may be kept in a buffer and written to the secondary volume whenever the buffer gets full or at another convenient time. Non-volatile RAM can be used to increase this buffer safely.

If the write is to a clean region, a synchronous update of the dirty region log (DRL) is performed 354. Then, both the primary and secondary writes are started 356, 358. Once the primary write is completed 360, the status is returned to the host 362. If a host-based volume manager is used, this happens independently of the secondary write. If an error occurred in the primary write, it is indicated in the write log by adding an additional entry. Of course, there are two possibilities with respect to the completion of the secondary write (i.e. the duplicate write made to a secondary volume). That is, the secondary write may be completed before 364 or after 366 the completion of the primary write 360. It is noted that whether the secondary write is completed before 364 or after 366 does not affect implementation of the present invention. As with completion of the primary write, if an error occurred in the secondary write, it is indicated in a write log by adding an additional entry to the write log.

Figure 7:
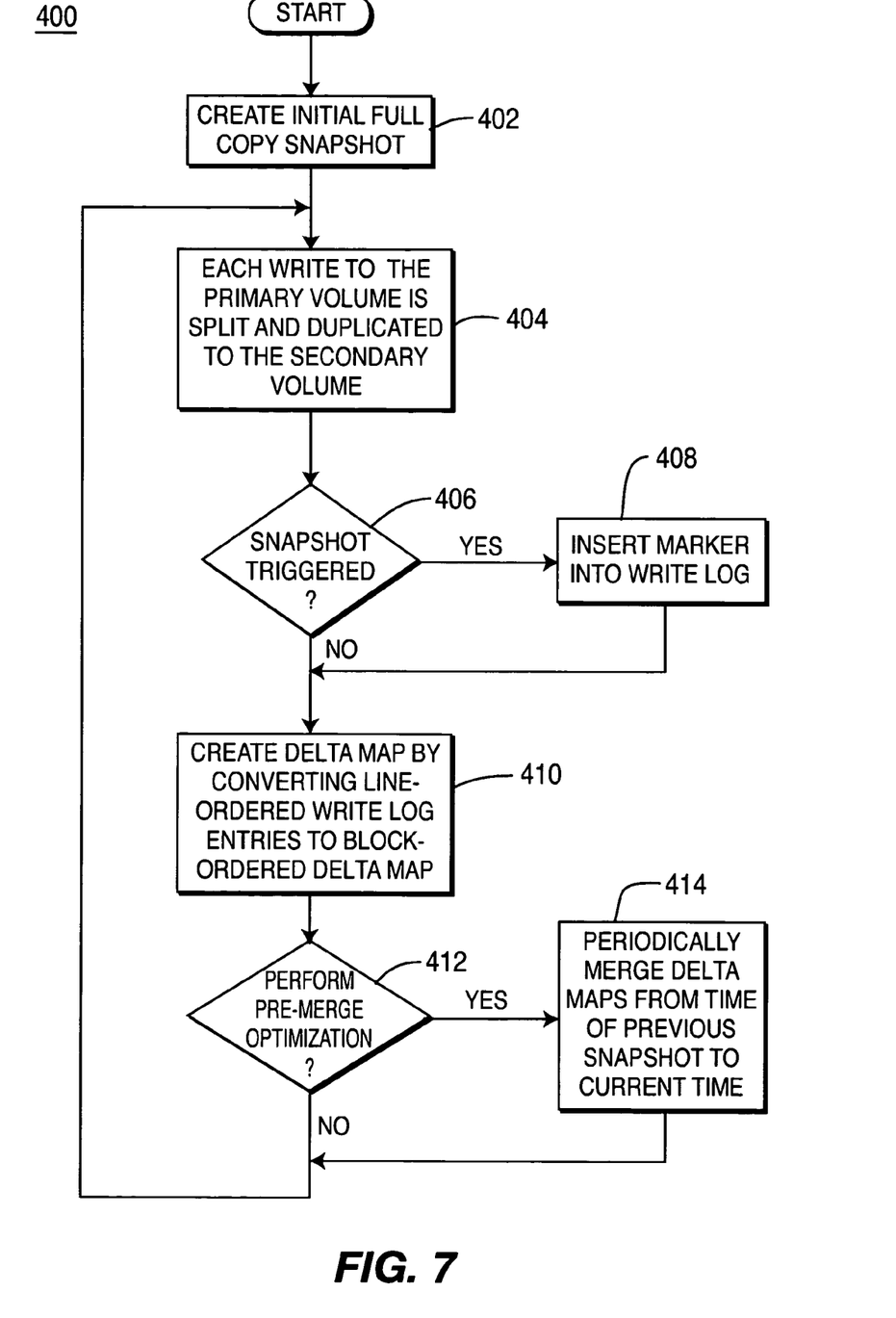
FIG. 7 is an overview of the operation of the complete data protection system.

Referring now to FIG. 7, the data protection system preferably operates according to method 400. The method 400 begins with step 402 wherein an initial full copy snapshot is created. The initial snapshot is the first snapshot taken of the data existing on the primary volume.

By way of explanation, assuming the present invention is implemented to protect a system that is currently in production. Such a system already contains important data on the primary volume at time t0. Hence, if the system starts recording the changes from this point on, the volume cannot be reconstructed at a later time unless there is a copy of the volume as it was at time t0. The initial full copy does exactly this—it initializes the secondary volume to a state where the contents of each block at time t0 are known. It is noted that in the special case when the primary volume is empty or will be formatted anyway, users have the option to disable the initial full copy. This means, however, that if they want to restore the volume back to time t0, an empty volume will be presented. To provide further explanation, assume that the primary volume already contains important data. In that case, if blocks 5, 9, and 57 are overwritten at times t1, t2, and t3 respectively, it is not possible to present a complete volume image as it was at time t2. This is because it is not known what blocks 1, 2, 3, 4, 6, 7, 8, 10, 11, etc. looked like at that time without having taken a full copy snapshot first.

Referring again to FIG. 7, the initial snapshot establishes time zero for the secondary volume, as explained above. Once the state of the primary volume at time zero is established, each write to the primary volume is split and duplicated to the secondary volume (step 404). In step 406, it is determined whether a snapshot is triggered. If so, a marker is inserted into the secondary volume write log in step 408 and then the method proceeds to step 410. A snapshot in this context is simply a point in time to which the system can recover to at a later time. Delta maps are kept for that point in time until the snapshot expires. Note that because all data has already been stored in the write log, no data movement is necessary to take a snapshot. If no snapshot is taken, the method 400 proceeds directly to step 410.

In step 410, a delta map is created by converting the time-ordered write log entries to a block-ordered delta map. Next, in step 412, it is determined whether pre-merge optimization will be performed. If so, delta maps are periodically merged to provide a greater granularity in the data on the secondary volume. It is noted that merging of delta maps can occur at any time and according to any desired policy. In the preferred embodiment, the merging algorithm looks for adjacent delta maps with the same expiration policy and merges those. This minimizes the number of merge operations that will be required upon expiration. In a different embodiment, pre-merging occurs automatically after a certain number of writes W or after a certain time period T. Additionally, the system is capable of storing full maps of the primary volume at various points in time. This significantly accelerates the merging process later because fewer maps need to be merged. Regardless of whether pre-merge optimization is performed, the method 400 cycles back to step 404.

Although the present invention has been described in detail, it is to be understood that the invention is not limited thereto, and that various changes can be made therein without departing from the spirit and scope of the invention, which is defined by the attached claims.

What is claimed is:

1. A method for providing continuous data protection, the method comprising the steps of:
   duplicating a sequence of writes made to a primary volume to a secondary volume, the sequence of writes to the secondary volume being in a sequential order based on a time of a write to the primary volume;
   mapping the writes between the primary volume and the secondary volume; and
   organizing the mapping of the writes into mapping data structures wherein the structures enable the primary volume to be rewound to any point in time, thereby enabling changes to the primary volume to be tracked between any two points in time.

2. The method of claim 1 wherein a mapping data structure is used to selectively play back portions of the secondary volume.

3. The method of claim 1 further comprising the step of merging mapping data structures together to create a new volume that is identical to the primary volume at a previous point in time.

4. The method of claim 1 further comprising the step of merging mapping data structures that have the same expiration policy to enhance system performance.

5. The method of claim 1 further comprising the step of fading out data by merging the mapping data structures thereby freeing up blocks that are no longer used.

6. The method of claim 1, wherein the mapping data structures are delta maps.

7. The method of claim 1, wherein the sequential order on the secondary volume is sequential in time.

8. The method of claim 1, wherein the sequential order on the secondary volume is sequential with respect to a storage location on the secondary volume.

9. A system for providing continuous data protection, the system comprising:
   a host computer;
   a primary volume for storing a sequence of data written by the host computer;
   a secondary volume wherein the sequence of writes made to the primary volume are duplicated on the secondary volume, the sequence writes to the secondary volume being in a sequential order based on a time of a write to the primary volume; and
   a continuous data protection system configured to manage the duplication of writes to the secondary volume and to map data between the primary volume and the secondary volume using a mapping data structure, wherein the mapping data structure is configured to track changes to said primary volume between any two points in time.

10. The system of claim 9 further comprising a volume manager for mirroring writes to the primary volume and the secondary volume.

11. The system of claim 10 wherein the volume manager is a software module running on an intelligent storage switch.

12. The system of claim 10 wherein the volume manager is a software module running on a server.

13. The system of claim 9, wherein the sequential order on said secondary volume is sequential in time.

14. The system of claim 9, wherein the sequential order on said secondary volume is sequential with respect to a storage location on said secondary volume.

15. The system of claim 9, wherein a mapping data structure is used to selectively play back portions of said secondary volume.

16. The system of claim 9, wherein said continuous data protection system is further configured to merge mapping data structures together to create a new volume that is identical to said primary volume at a previous point in time.

17. The system of claim 9, wherein said continuous data protection system is further configured to merge mapping data structures that have the same expiration policy to enhance system performance.

18. The system of claim 9, wherein said continuous data protection system is further configured to fade out data by merging the mapping data structures, thereby freeing up blocks that are no longer used.

19. The system of claim 9, wherein the mapping data structures are delta maps.

20. A method for continuously protecting data on a primary volume, comprising the steps of:
   creating an initial snapshot of the primary volume, the initial snapshot located on a secondary volume;
   duplicating a sequence of writes made to the primary volume to a write log on the secondary volume, the sequence of writes to the write log being in a sequential order based on a time of a write to the primary volume;
   determining whether a snapshot has been triggered;
   inserting a marker into the write log if a snapshot has been triggered; and
   creating a mapping data structure from the write log, wherein the mapping data structure represents changes to the primary volume between two points in time, whereby the method continuously protects the primary volume from the time of the initial snapshot.

21. The method of claim 20, wherein the sequential order on the secondary volume is sequential in time.

22. The method of claim 20, wherein the sequential order on the secondary volume is sequential with respect to a storage location on the secondary volume.

23. The method of claim 20, wherein the creating step includes converting the write log to a block-ordered mapping data structure.

24. The method of claim 20, wherein the mapping data structure is used to play back portions of the write log.

25. The method of claim 20, further comprising the step of:

periodically merging mapping data structures from a time of a previous snapshot to the current time, whereby the merging step optimizes the mapping data structures.

26. The method of claim 25, wherein the merging step is performed according to a predetermined policy.

27. The method of claim 25, wherein the merging step is performed after a predetermined number of writes to the primary volume.

28. The method of claim 25, wherein the merging step is performed after a predetermined period of time.

29. The method according to claim 25, wherein the merging step includes merging mapping data structures having the same retention policy.

30. A computer-readable storage medium storing a set of instructions for execution by a general purpose computer to provide continuous data protection, the set of instructions comprising:

a duplicating code segment that duplicates a sequence of writes made to a primary volume to a secondary volume, the sequence of writes to the secondary volume being in a sequential order based on a time of a write to the primary volume;

a mapping code segment that maps the writes between the primary volume and the secondary volume; and an organizing code segment that organizes the mapping of the writes into mapping data structures wherein the structures enable the primary volume to be rewound to any point in time, thereby providing continuous data protection to the primary volume.

31. A computer-readable storage medium storing a set of instructions for execution by a general purpose computer to provide continuous data protection, the set of instructions comprising:

a first creating code segment that creates an initial snapshot of a primary volume, the initial snapshot located on a secondary volume;

a duplicating code segment that duplicates a sequence of writes made to the primary volume to a write log on the secondary volume, the sequence of writes to the write log being in a sequential order based on a time of a write to the primary volume;

a determining code segment that determines whether a snapshot has been triggered;

an inserting code segment that inserts a marker into the write log if a snapshot has been triggered; and a second creating code segment that creates a mapping data structure from the write log, wherein the mapping data structure represents changes to the primary volume between two points in time, whereby the primary volume is continuously protected from the time of the initial snapshot.

* * * * *